United States Patent [19]
Demarest, Jr. et al.

[11] Patent Number: 4,634,461
[45] Date of Patent: Jan. 6, 1987

[54] METHOD OF MELTING RAW MATERIALS FOR GLASS OR THE LIKE WITH STAGED COMBUSTION AND PREHEATING

[75] Inventors: Henry M. Demarest, Jr., Natrona Heights; Gerald E. Kunkle, New Kensington; Clement C. Moxie, Natrona Heights, all of Pa.

[73] Assignee: PPG Industries, Inc., Pittsburgh, Pa.

[21] Appl. No.: 748,640

[22] Filed: Jun. 25, 1985

[51] Int. Cl.$^4$ ............................................. C03B 5/04
[52] U.S. Cl. ........................................ 65/27; 65/134; 65/135; 65/335
[58] Field of Search ............... 65/27, 134, 135, 136, 65/335

[56] References Cited

U.S. PATENT DOCUMENTS

| 2,007,755 | 7/1935 | Ferguson | 65/134 |
| 3,260,587 | 7/1966 | Dolf et al. | 65/135 |
| 4,519,814 | 5/1985 | Demarest, Jr. | 65/136 X |
| 4,551,161 | 11/1985 | Savolskis | 65/134 X |

FOREIGN PATENT DOCUMENTS

658141 10/1951 United Kingdom ................. 65/134

Primary Examiner—Arthur Kellogg
Attorney, Agent, or Firm—Dennis G. Millman

[57] ABSTRACT

Raw materials such as glass batch are preheated by combustion of liquid or solid fuel such as fuel oil or coal mixed with the batch material. In one embodiment the material being heated and the gaseous products of combustion are passed cocurrently through the preheating stage to avoid carbonaceous effluents. Preheated materials and any ash from the fuel are transferred to a second stage where they are liquefied. Carbon monoxide from the preheating stage may serve as fuel for the liquefying stage.

54 Claims, 2 Drawing Figures

METHOD OF MELTING RAW MATERIALS FOR GLASS OR THE LIKE WITH STAGED COMBUSTION AND PREHEATING

BACKGROUND OF THE INVENTION

This invention relates to the use of solid carbonaceous fuels such as coal as a fuel source in a process for making glass or similar fusion processes and to the use of mixtures of solid or liquid fuels with the raw materials.

It is well known that in regions where coal is available it is usually the cheapest source of energy relative to other traditional energy sources such as natural gas, fuel oil, and electricity. Therefore, it has been suggested that coal be used as a fuel source for melting glass and the like. Examples of such proposals may be seen in U.S. Pat. Nos. 3,969,068 and 4,006,003. However, the use of coal to fuel direct fired process furnaces has been found to have certain drawbacks that have discouraged its widespread use. A major drawback is the ash content of coal. When coal is combusted with an overhead burner in an open hearth type furnace conventionally employed to melt glass, substantial amounts of ash are entrained in the exhaust gas stream which can cause the regenerators to become plugged and which necessitates removal of the ash from the exhaust gas before it can be discharged to the atmosphere. Some of the ash becomes deposited on the walls of the melting chamber where it melts to a liquid slag that runs down the walls of the vessel into the melt. The runnage of molten slag has a deleterious affect on the refractories of the furnace, and the molten slag entering the melt introduces unwanted compositional variations and inhomogeneities into the product material. The slag often has a high iron content relative to glass, and runnage of the slag into the melt can cause undesirable streaks of coloration. These problems have discouraged the use of coal as a direct fuel for melting products for which uniformity of composition is an important consideration. This is particularly the case with flat glass, where compositional variations cause optical distortion in the product glass.

A drawback to the use of coal or other carbonaceous fuel in admixture with the raw materials, particularly when melting clear glass, is that carbon in amounts sufficient to provide significant energy to the melting process also has a reducing effect on the melt, and iron and sulfur present in a reduced glass cause brown coloration. Moreover, coal itself contributes iron and sulfur to the melt. Small amounts of powdered coal (typically less than 0.1% by weight) have been included in clear glass batch to aid the melting process, but such amounts are not significant energy sources, and larger amounts were considered detrimental. Even when brown glass is being produced, the amount of carbon employed would not be considered a significant fuel contribution.

U.S. Pat. No. 3,294,505 discloses melting glass in a bed of batch briquettes and coke. The process is restricted to a relatively narrow group of low viscosity glass compositions for low quality applications. Additionally, it would be desirable to avoid the cost of agglomerating the batch.

In commonly assigned, copending U.S. application Ser. No. 624,879 filed June 27, 1984, now U.S. Pat. No. 4,551,161, there is disclosed a technique of wetting glass batch with fuel oil. Only a minor portion of the energy requirement of the melting process is supplied by the fuel oil.

Another problem with using coal and some other carbonaceous fuels is that such fuels contain relatively volatile hydrocarbon fractions that are driven off and escape with the exhaust gas if heated before ignition. This is a problem particularly if it is desired to preheat raw materials in admixture with carbonaceous fuel. Also, feeding carbonaceous fuels in a non-atomized form to a combustion zone generally produces smoke-laden exhaust that is environmentally undesirable. After-burning or otherwise treating the exhaust gas or carbonizing the fuel in a preliminary operation are costly options that are preferably avoided.

SUMMARY OF THE INVENTION

In one aspect of the present invention fuel having an ash content (e.g., coal) is employed as a substantial energy source for a melting process while avoiding the problems usually associated with the ash. The ash-producing fuel is combusted in a discrete batch preheating stage of the melting process where the ash becomes incorporated into the batch material. Preferably the batch material and the fuel are fed to the preheating stage in admixture with each other to establish distribution of the ash throughout the batch and to provide intimate contact between the batch and the fuel during combustion. Combustion is sustained by feeding an oxidant (preferably substantially pure oxygen) to a zone of combustion in the preheating stage. Agitation of the material in the preheating stage may be provided to enhance contact between the batch and the combusting fuel and to assist in mixing the ash into the batch. The heated batch and ash mixture, preferably still in a pulverulent state, is passed to a subsequent stage where the mixture is liquefied.

A significant portion of the overall energy required for melting can be provided by means of an economical fuel such as coal by thus preheating the batch material to a temperature just below the temperature at which significant fusing occurs. By feeding a nearly homogeneous mixture of batch and ash to the liquefying stage, the melt that is subsequently formed can be essentially uniform in composition even though substantial quantities of ash have been introduced. Therefore, one of the problems associated with the use of an ash-producing fuel such as coal is substantially alleviated.

By combusting the fuel while in contact with the batch material and thus avoiding ash entrainment in the exhaust and slag formation on the interior surfaces of the vessel, environmental problems and deterioration of the furnace are avoided, which is desirable for any melting process. But the avoidance of slag runnage into the melt makes the present invention particularly attractive for the melting of glass and the like where compositional homogeneity is important. Even relatively viscous, difficult to homogenize glass such as soda-lime-silica flat glass, for which there are very high standards of optical quality, can be produced by the present invention. It is also an advantage that no agglomeration of the batch is required.

In yet another aspect of the invention, the oxygen supply and temperature at the preheating stage may be controlled so as to produce substantial amounts of carbon monoxide as a product of the combustion of the fuel. The carbon monoxide is passed to a subsequent stage such as the liquefaction stage where it serves as at least part of the fuel for combustion in that stage. In another alternative, the first stage combustion may be incomplete, whereby some of the fuel may be permitted to remain uncombusted so that it may be passed along with the batch to the second stage to serve as at least part of the fuel there.

To permit the use of higher temperatures in the preheating stage and to increase the amount of carbon monoxide produced, the constituents of glass batch that fuse at relatively low temperatures may be omitted from the first stage and introduced at the second stage or a subsequent stage. Excluding the sodium source (e.g. soda ash) from a soda-lime-silica glass batch permits the use of temperatures in the first stage that are sufficiently high to calcine carbonate source materials such as limestone and dolomite as well as to produce carbon monoxide. Treating the silica source material (sand) alone in the first stage enables the first stage to operate at very high temperatures that can yield large amounts of carbon monoxide exhaust.

Following the liquefaction stage, a subsequent third stage may be provided in which the melting process may be carried further. When fuel is mixed with the batch, there may be incomplete contact between the fuel and the oxidant in the liquefaction stage, or there may be excess fuel present, and thus the liquefied material may exit the second stage in a reduced state. In that case, the third stage may also include means to re-oxidize the melt, for example, by means of submerged combustion with an oxygen-rich flame and/or by bubbling an oxidizing agent (preferably oxygen) through the melt. Re-oxidizing is particularly useful for avoiding discoloration of clear glass. Undesired coloration of clear glass by iron and sulfide ions can be avoided by re-oxidizing the melt in the third stage. This aspect of the invention relates to commonly assigned U.S. patent application Ser. No. 748,639 filed on even date herewith by Gerald E. Kunkle, Henry M. Demarest, Jr., and Larry J. Shelastak entitled "Melting Raw Materials for Glass or the Like Using Solid Fuels or Fuel-Batch Mixtures."

The chemical constituents of coal ash are generally compatible with those for most glasses, and therefore the glasses can incorporate some of the ash with little or no detrimental affect on the glass product, provided that the ash can be thoroughly homogenized in the melt. However, the amount of ash produced when coal constitutes the major fuel source for a conventional melting process is difficult to adequately homogenize for some types of glass for which optical requirements are critical. Therefore, it is an advantage of the present invention that coal is employed as the fuel in a discrete stage of the overall melting process so that mixing of the batch with the ash is provided prior to liquefying. Also, in the discrete preheating stage less than the total energy requirement need be provided so that less coal is required and less ash is produced. Moreover, the overall efficiency of the staged melting process has been found to reduce the overall energy requirements for melting glass, further reducing fuel requirements. As a result, coal may constitute a major portion or the entire energy source for preheating even flat glass batch up to the fusion temperature. In some modes of operation the coal may constitute the major or entire energy source for the entire liquefying operation.

The novel fuel arrangements of the present invention may constitute the entire fuel source or may supplement conventional heat sources. The portion of the total thermal energy requirement of the preheating stage contributed by the novel arrangements is substantial; that is, greater than that provided by prior art inclusion of carbonaceous material as a melting aid, coloring agent, or binder. It is believed that contributing as much as 5 percent of the energy is uncharacteristic of these prior art uses of carbonaceous materials in a melter. For economic reasons, it is preferred that the novel fuel usage of the present invention be maximized so that it supplies a majority of the energy through the preheating stage, and optimally all of the energy.

Another feature of preferred embodiments of the present invention is the suppression of exhaust emissions of products of incomplete combustion such as smoke, soot, or substances volatilized from the fuel. As batch material in contact with solid or liquid fuel is conveyed toward a heated zone, the temperature of the fuel gradually increases and the fuel begins to give off volatiles and to smolder before being fully ignited. The resulting objectionable emissions are substantially eliminated by this aspect of the present invention by maintaining the flow of gas in the preheating stage in generally the same direction as the conveyance of the batch-fuel mixture through the preheating stage. This co-current flow pattern carries the emissions from the early stages of heating into the combustion zone, where the combustible emissions are incinerated. Not only are the objectionable emissions eliminated, but also their combustion contributes to the heating of the batch materials. The exhaust gas from the preheating stage may be subjected to further combustion by passing it to a subsequent combustion zone such as in the liquefying stage.

Other environmental advantages also result from the invention. The stagewise approach lends itself to the use of oxygen instead of air to support combustion. The elimination or reduction of the amount of nitrogen in the combustion gases reduces the amount of nitric oxides ($NO_x$) produced. Exhaust gas volumes are considerably reduced when using oxygen firing, thereby reducing gas velocity, which in turn yields less entrainment of particulate batch material. The absence of nitrogen also produces a higher flame temperature. The use of essentially pure oxygen and the exclusion of all air maximizes these advantages, but the advantages can be partially realized in accordance with the degree to which the oxygen concentration exceeds that of air.

Another environmental advantage is that some of the sulfurous emissions usually associated with the combustion of sulfur-containing fuels such as coal may be suppressed. Contact between the combustion gases and the batch material (particularly glass batch containing limestone or the like) may remove sulfur oxides from the gas stream.

The invention will be more fully understood from the drawings and the description which follows.

DETAILED DESCRIPTION

The detailed description of the invention is made with reference to an example of a glass melting operation for which the invention has been found to be particularly useful. The invention is useful with all types of glass, including flat glass, container glass, fiber glass, and sodium silicate glass.

However, it should be understood that the invention is applicable to the melting of other, similar materials and in particular to the conversion of mineral-type materials to a molten state. Other examples include: fusing of glassy and ceramic materials, melting of frits, and smelting of ores.

Figure 1:
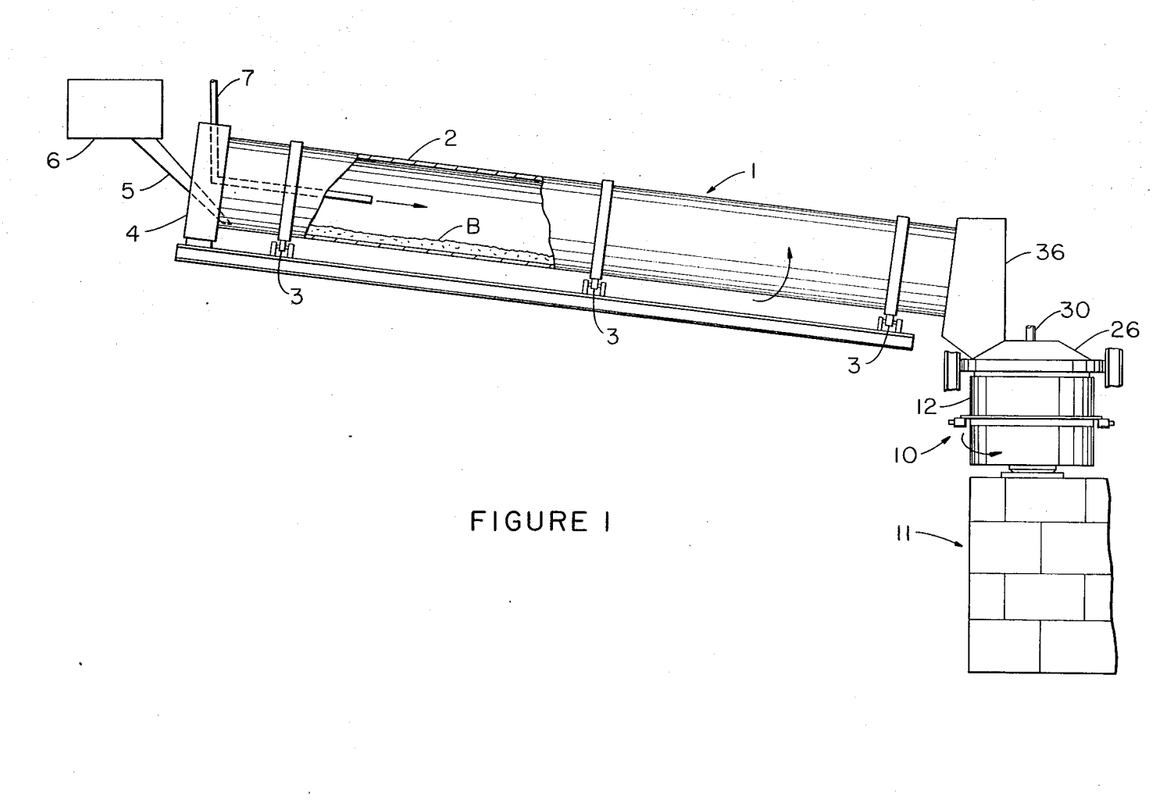
FIG. 1 shows a preferred embodiment of the present invention including a rotary kiln preheating stage shown partially broken away, a rotary second stage liquefaction chamber, and a third stage refining chamber.

The first stage may take the form of a variety of gas/solid contact devices, but the preferred embodiment is a rotary kiln 1 as shown in FIG. 1. Alternative devices include a fluidized bed and a cyclonic separator/contactor as are known in the art. The rotary kiln comprises a cylindrical shell 2 rotatably supported on rolls 3 at a slight angle from horizontal. A single-walled metal shell as shown in the drawing may be adequate, or better thermal efficiency may be attained by means of a refractory lining or a double walled metal shell with insulation between the walls.

A stationary inlet housing 4 closes the inlet end of the rotary kiln. Feed duct 5 extends through the housing wall for directing pulverulent batch material into the rotary kiln from a feed rate control device 6. The batch B may be mixed with fuel prior to being fed to the rotary kiln, or fuel and batch may be fed separately to the rotary kiln where they become mixed. Oxidizing gas (e.g., air, but preferably oxygen) may be fed to the rotary kiln by a conduit 7 extending through the wall of inlet housing 4. The conduit 7 may project into the rotary kiln a sufficient distance to establish the combustion zone some distance downstream from the batch feed area. Batch materials that include oxygen-containing compounds such as carbonates may contribute some of the oxygen for supporting the combustion. This is advantageous because carbon dioxide is removed before the batch is liquefied. After liquefying, release of the carbon dioxide would have produced bubbles in the melt that are difficult to eliminate. In the preferred embodiment the products of combustion flow cocurrently with the batch through the rotary kiln into the second stage liquefying means 10 by way of an outlet enclosure 36 that joins the two stages.

Ignition may be initiated in the combustion zone by auxiliary heating means such as a burner temporarily inserted into the kiln. Once ignition of the fuel in contact with the batch is established, the combustion zone can be maintained at a substantially fixed region of the rotary kiln by balancing the oxygen feed rate and the rate at which the batch and fuel are conveyed along the rotary kiln. The latter rate is essentially controlled by the speed with which the inclined kiln is rotated. The solid materials and the gas streams move cocurrently through the rotary kiln so that volatile materials initially driven from the fuel are carried into the combustion zone where they are incinerated.

Although not preferred, gas and batch could flow countercurrent to each other in the rotary kiln or other preheater. In that case, it may be necessary to provide means to render the exhaust environmentally acceptable, such as a bag collector for particulates. A portion of the exhaust may be recycled to a combustion zone in either the preheater or the liquefaction stage so as to eliminate combustibles. Another technique to treat the exhaust gas and to recover waste heat is to pass the exhaust into contact with the batch material in an additional, preliminary preheating stage. A batch mixture that includes carbonates (e.g., limestone) is also useful in stripping sulfur oxides from the exhaust.

Figure 2:
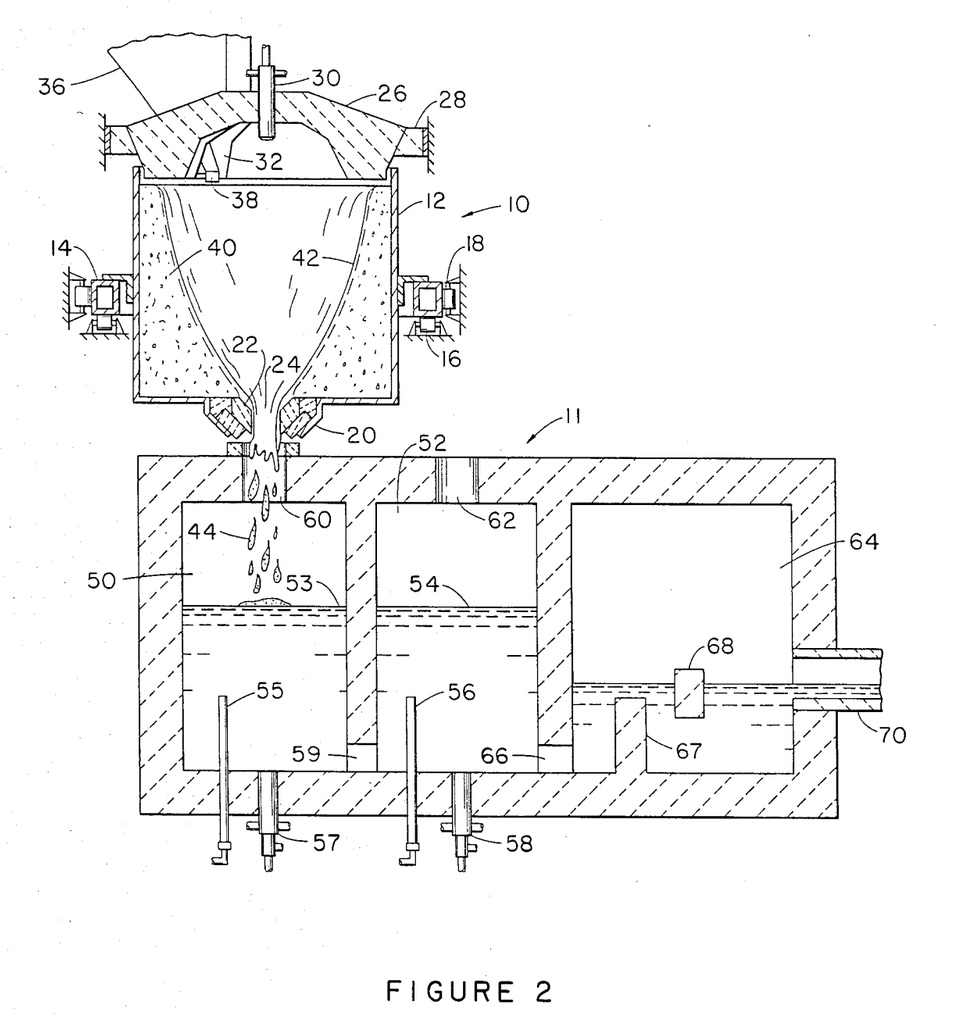
FIG. 2 is an enlarged vertical cross-sectional view of the second and third stages wherein the third stage is provided with submerged combustion means.

The specific preferred embodiment of the second stage 10 is shown in FIG. 2 and is in accordance with the teachings of U.S. Pat. No. 4,381,934 of Kunkle et al. and of U.S. patent application Ser. No. 661,267 filed Oct. 16, 1984 also of Kunkle et al., the teachings of which are hereby incorporated by reference. The second stage is adapted to liquefy the batch and is characterized by a sloped melting surface to receive batch materials that melt as a thin layer on the sloped surface and quickly drain therefrom when liquefied. The liquefaction stage 10 shown here is a preferred embodiment of the Kunkle et al. teachings wherein the sloped surface substantially encircles a central cavity and the vessel rotates about a substantially vertical axis. The circular arrangement offers distinct advantages for the present invention and for the efficiency of the melting process in general, but it should be understood that the present invention in its broader aspects is not limited to the circular liquefaction arrangement.

By separating the liquefaction step from the remainder of the melting process, energy is employed more efficiently in each stage of the process by optimizing the conditions in each stage to meet the particular needs of the step being performed there. Additional efficiencies are achieved by encircling the heated zone with the batch material and by employing an insulating layer of the batch material or a compatible substance to thermally insulate the liquefaction zone. Because of the overall energy efficiency of the stagewise process, and because only a portion of the overall energy requirement for melting is consumed in the liquefaction zone, it has been found that the amount of energy consumed in the liquefaction stage is relatively low and a variety of heat sources can be used efficiently. Combustion of fuel, particularly with oxygen firing, is preferred, and electrical sources such as electric arc or plasma torch may be used. Coal or other solid fuel may constitute a portion or all of the fuel in the second stage, some of which may be unburned fuel from the first stage. When carbon monoxide is produced in the first stage, the exhaust from the first stage may be passed to the second stage where it may supply a substantial portion of the energy requirement there.

With reference to FIG. 2, the liquefaction stage 10 includes a generally cylindrical vessel 12 which may consist of a steel drum. The vessel 12 is supported on a circular frame 14 which is, in turn, mounted for rotation about a generally vertical axis corresponding to the center line, or axis of symmetry, of the vessel on a plurality of support rollers 16 and aligning rollers 18. A bottom section 20 of the vessel holds an axially aligned annular bushing 22 defining a central drain opening 24. The bushing 22 may be comprised of a plurality of ceramic pieces, and the bottom section 20 may be detachably secured to the remainder of the vessel 12 so as to facilitate changing the bushing 22.

A refractory lid 26, preferably in the configuration of an upward dome, is provided with stationary support by way of a surrounding frame member 28. The lid 26 may include at least one opening through which may be extended at least one cooled gas supply conduit 30. The supply conduit 30 may constitute a burner or merely a supply conduit for oxygen or other oxidizing agent to support combustion of the fuel being supplied to the liquefaction chamber. If fuel is being supplied from the first stage, the conduit 30 may be used to supply oxygen or the like to the vessel after the ignition temperature has been achieved. Optionally, a portion of the heat for the liquefaction stage may be supplied by a conventional burner or other heat source in addition to the energy being provided by fuel from the first stage. The conduit 30 may be centrally located as shown to flood the entire cavity with oxygen, or it may be angled or located off-center to direct the oxygen and/or fuel onto the melting layer.

An opening 32 through the lid 26 may be provided for feeding the batch to the liquefaction stage, and, as shown in FIG. 2, an outlet enclosure 36 at the end of the rotary kiln 1 may be provided with a chute portion adapted to direct material into the liquefaction stage. An adjustable baffle 38 may be provided at the end of the chute to direct the flow of batch onto the sidewalls of the vessel 12.

Preferably, a stable layer of pulverulent material 40 lines the interior of the vessel 12. This layer acts as the insulating lining to protect the vessel 12 from the heat within the vessel. In those applications where it is desired to avoid contamination of the product material, the layer 40 is preferably of substantially the same composition as the batch material. Before the melting process is started, the stable lining 40 is provided in the melter by feeding loose pulverulent material such as the batch material into the vessel 12 while the vessel is rotated. The loose material assumes a generally parabolic contour as shown in FIG. 2. The pulverulent material may be wetted, for example, with water during the initial stage of forming the stable lining to facilitate cohesion of the layer along the sidewalls. When the lining 40 is comprised of batch material, it need not include the fuel component that may be mixed with the batch during operation. Other minor differences between the lining material and the throughput material may be acceptable, depending upon the requirements of the particular process.

During the melting process, continuous feeding of batch to the liquefaction stage 10 results in a falling stream of batch that becomes distributed over the face of the stable lining 40, and by the action of the heat from combustion within the vessel 12 becomes liquefied in a transient layer 42 that runs to the bottom of the vessel and passes through the open center 24 in the bushing 22. The liquefied material 44 falls from the first stage 10 into the second stage 11 for further processing. In this manner, the initial step of liquefying the batch can be efficiently carried out because the material, once it has become liquefied, immediately is removed from the vicinity of the heat source and is continuously replenished with fresh batch material, thereby maintaining a large temperature difference and therefore a high rate of heat transfer in the liquefaction vessel. The constant replenishment with relatively cool, fresh batch in cooperation with the insulating lining serves to preserve the structural integrity of the liquefaction vessel without the use of forced cooling of the vessel.

The material for the lining 40 provides thermal insulation and preferably also serves as a non-contaminating contact surface for the transient melting layer 42 and, most preferably, the stable lining includes one or more constituents of the batch material. It is desirable for the thermal conductivity of the material employed as the lining to be relatively low so that practical thicknesses of the layer may be employed while avoiding the need for wasteful forced cooling of the vessel exterior. In general, granular or pulverulent mineral source raw materials provide good thermal insulation, but in some cases it may be possible to use an intermediate or product of the melting process as a non-contaminating, stable layer. For example, in a glassmaking process pulverized cullet (scrap glass) could constitute the stable layer, although a thicker layer may be required due to the higher thermal conductivity of glass as compared to glass batch. In metallurgical processes, on the other hand, using a metallic product as the stable layer would entail unduly large thicknesses to provide thermal protection to the vessel, but some ore materials may be satisfactory as insulating layers.

The preferred embodiment of the liquefaction stage described above entails rotating the lining about the central cavity, but it should be understood that the present invention is applicable to embodiments in which the lining encircles the heated cavity but is not rotated. Additionally, the invention is applicable to embodiments in which the lining is a sloped surface, but does not encircle the heat source (e.g., melting takes place on a ramp). Examples of such variations are described in the aforesaid Kunkle et al. patent and application.

Air could be used as the oxidant, but it is preferred to use oxygen (i.e., a higher concentration of oxygen than in air) so as to reduce the volume of gaseous throughput. As a result, the equipment in both first and second stages may be made compact since the exhaust gas stream is relatively low in volume and high in temperature. Also, eliminating nitrogen from the system increases the emissivity of the flame and therefore increases heat transfer. The intense heat of combustion supported by oxygen firing is compatible with the preferred embodiments of the second stage because of the thermal protection and efficient heat transfer afforded by the encircling lining.

The temperature attained in the preheating stage depends upon the amount of combustion, which in turn depends upon the amounts of fuel and oxygen provided. Even a small amount of combustion is useful for the sake of the heat it transfers to the batch materials. Preferably, the amount of heat generated by the combustion in the first stage is enough to produce a maximum temperature increase of the batch without fusing batch ingredients to the extent that the batch is no longer free-flowing. For example, a typical flat glass batch mixture containing substantial amounts of soda ash would be essentially restricted to temperatures below the melting point of soda ash (851° C.), preferably lower, to avoid clogging of the rotary kiln. In one option, the relatively low temperature melting ingredients of the batch may be omitted from the batch being fed to the first stage, but may be fed directly to the second stage, thereby permitting higher temperatures to be attained in the first stage. Advantageously, at temperatures above about 870° C. calcium carbonate and magnesium carbonate, typical ingredients of a glass batch, are calcined, i.e., they decompose and release carbon dioxide. Eliminating the carbon dioxide while the materials are still in the solid state is advantageous because it avoids production of carbon dioxide bubbles in the melt. Even higher temperatures can be permitted in the preheater if the material being heated in that stage is restricted to the highest temperature melting portions of the batch and the remainder of the ingredients are fed directly to a downstream stage. For example, heating only sand in the rotary kiln would permit preheat temperatures in excess of 1000° C. to be attained. Separate preheating facilities may be provided for any of the materials that bypass the first stage. Some of the glass batch ingredients such as soda ash or caustic soda may be fed to the second stage in molten form. It may also be preferred to feed cullet directly to the second stage when the first stage is operated at relatively high temperatures, in which case the cullet may be preheated by contact with exhaust gas.

At most operating temperatures the first stage combustion can produce some carbon monoxide if insufficient oxygen is provided to complete combustion of the fuel. Thus, the exhaust from the first stage can be passed to the second stage where the carbon monoxide content serves as part or all of the fuel for the second stage when combusted with additional oxygen. The proportion of carbon monoxide in the products of combustion increases and the proportion of carbon dioxide decreases at higher temperatures. Therefore, to produce predominating proportions of carbon monoxide to fuel the second stage, it is preferred that the first stage be operated at a peak temperature greater than about 900° C. When supplied with sufficient fuel and a deficiency of oxygen, the entire fuel requirement for the second stage can be supplied by carbon monoxide from the first stage. Combustion of fuel to carbon monoxide releases approximately one third of the heat content of the fuel, the remainder being released upon combustion of the carbon monoxide to carbon dioxide. Therefore, the relative energy requirements of the first and second stages should be taken into account when selecting the amount of carbon monoxide to be produced in the first stage. For example, glass batch is capable of utilizing twice as much energy in the preheating stage as in the liquefying stage, so that producing only carbon dioxide in the first stage may not be the most efficient use of the energy. When preheating a complete flat glass batch mixture, a preferred distribution of the heat content of the fuel can be achieved at an output from the first stage of approximately 50% carbon monoxide and 50% carbon dioxide (molar basis).

The ability to employ coal is an advantage of the present invention because of the abundant supply and relative low cost of coal in some regions. But other solid or liquid carbonaceous fuel materials may be used to advantage in the present invention, for example, fuel oil, coke fines, petroleum coke, peat, lignite, oil shale, sawdust, bagasse, and paper waste. Liquid petroleum products such as fuel oil also have the advantage of wetting the batch so as to suppress dust formation and entrainment in the exhaust gas stream.

For economic reasons, coal is the preferred fuel, in particular, bituminous coal. The heating value of a typical Pennsylvania bituminous coal is generally in the range of 11,000 to 15,000 BTU per pound (25.5 million to 34.8 million joules per kilogram) with an ash content ranging from about 3 percent to 9 percent by weight depending upon the source. To melt glass in a conventional, efficiently operated, overhead fired regenerative furnace burning natural gas or fuel oil is generally considered to consume at least about 6 million to 7 million BTU per ton (7 million to 8 million joules per kilogram) of glass produced. Taking a typical Pennsylvania coal as an example, with a heat value of about 13,800 BTU per pound (32 million joules per kilogram) and an ash content of about 7 percent by weight, combustion of such a coal in a conventional glass melting furnace to meet the entire energy requirements of melting would yield an unacceptably large amount of ash. The liquefaction process described above has been found to consume from about 2 million to about 3 million BTU's per ton (2.3 million to 3.5 million joules per kilogram) of throughput. At that level of energy consumption, much less coal is required to supply the energy needs, and therefore the ash introduced into the melt from the coal is at acceptable levels even for producing glass of the high quality level required for flat glass.

The amount of coal to be utilized will depend upon the temperature to be achieved in the preheating stage and the heat content of the particular coal, which in turn is a function of its fixed carbon content. Because combustion may not be complete due to inaccessibility of oxygen to all parts of the coal, adding slightly more coal than is theoretically required may be preferred. By way of example, about 2% to 3% by weight of the Pennsylvania coal described above mixed with a flat glass batch mixture has been found to preheat the batch to about 550° C. to 650° C. when combusted with excess oxygen. The amount of carbon monoxide produced in such a case is small. In another example, a flat glass batch with the soda source (e.g., soda ash) omitted from the first stage (thus comprised chiefly of sand, limestone, and dolomite), having about 6% to 10% by weight of coal mixed therewith, is preheated to about 1100° C. to 1300° C. when combusted. A substantial amount of the limestone and dolomite are calcined, and if a limited amount of oxygen is supplied to the combustion zone, carbon monoxide predominates over carbon dioxide in the combustion product stream. Other carbonaceous fuel materials may be substituted for coal in amounts determined by their respective heat contents.

It should be understood that while the fuel in contact with the batch advantageously provides at least the majority, and preferably all, of the energy required for the preheating stage, the advantages of the present invention can be obtained by degrees with lesser amounts of fuel fed with the batch. In such a case, some of the energy may be provided by conventional burner means heating the preheating stage. In embodiments where the gas flow is countercurrent to batch flow in the preheater, exhaust gas passed from the liquefaction stage to the preheater may provide some energy for preheating.

The solid fuels such as coal to be mixed with the batch are preferably finely divided. The coal for example, is preferably no coarser than 60 mesh (U.S. standard sieve size) and 200 mesh coal has been found to be particularly satisfactory. The ignition point of coal varies somewhat, but oxidation of a typical bituminous coal may begin at about 170° C., and combustion is generally self-sustaining at temperatures above 250° C. when supplied with pure oxygen.

The following is a typical ash content from 25 parts by weight of coal:

| | |
|---|---|
| $SiO_2$ | 1.2 parts by weight |
| $Al_2O_3$ | 0.6 |
| $Fe_2O_3$ | 0.27 |
| CaO | 0.1 |
| Na and K | 0.5 |

It can be seen that these ash constituents are compatible with the composition of soda-lime-silica flat glass which may have the following composition:

| | |
|---|---|
| $SiO_2$ | 72-74% by weight |
| $Al_2O_3$ | 0-2 |
| $Na_2O$ | 12-15 |

-continued

| | |
|---|---|
| $K_2O$ | 0–1 |
| MgO | 3–5 |
| CaO | 8–10 |
| $Fe_2O_3$ | 0–0.2 |
| $SO_3$ | 0–0.5 |

Soda-lime-silica glass of the above type usually has a viscosity of at least 100 poises at a temperature of 1425° C.

The temparature at which the batch liquefies in the second stage will depend upon the particular batch materials, especially the amount and melting temperature of its lowest melting temperature ingredients. With glass batch, the most common low temperature melting ingredient is soda ash which melts at 1564° F. (851° C.). In practice, it has been found that commercial flat glass batch formulas liquefy at a somewhat higher temperature, about 2,000° F. (1090° C.) to about 2100° F. (1150° C.). Heat within the liquefaction stage may raise the temperature of the liquefied material slightly higher before it drains from the stage, and thus liquefied glass batch flowing from the liquefaction stage 10 may typically have a temperature on the order of about 2300° F. (1260° C.) but usually no higher than 2400° F. (1320° C.). Such a temperature and the short residence time in the liquefaction vessel are seldom adequate to fully complete the complex chemical and physical reactions involved in the melting process. Accordingly, the liquefied material is transferred to a third or "refining" stage 11 in which the melting process is furthered.

For glass, treatment in the refining zone typically entails raising the temperature of the liquefied material to facilitate melting of residual sand grains and to drive gaseous inclusions from the melt. A peak temperature of about 2500° F. (1370° C.) to about 2800° F. (1510° C.) is considered desirable for refining flat glass. Another desirable operation that may be carried out in this stage is to homogenize the molten material by agitation. Also, when the batch is liquefied under reducing conditions, resulting in the molten material entering the refining stage in a reduced condition, re-oxidation of the melt may be required for some end uses. Therefore, a function of the refining stage in the present invention can be the introduction of an oxidizing agent into the melt. All of these objectives are achieved by the preferred embodiment shown in FIG. 2. The vigorously stirred refining stage is well adapted not only for adjusting the oxidation state of the melt, but also for adding colorants, cullet, or compositional modifiers that are relatively easily melted. Great flexibility for making a wide variety of products is thus provided.

The preferred embodiment of the refining stage as shown in FIG. 2 employs submerged combustion in two chambers. A single-chambered refining stage may suffice for some applications, but for flat glass the preferred embodiment entails two submerged combustion chambers 50 and 52, each retaining a pool 53 and 54, respectively, of the molten material. The chambers may be provided with oxygen bubbler tubes 55 and 56 and water-cooled burners 57 and 58 below the level of the molten material. A submerged throat 59 permits material to flow from chamber 50 into chamber 52. An opening 60 at the top of chamber 50 permits the molten material 44 to fall from the liquefaction stage 10 into the chamber 50. Exhaust from the liquefier 10 and the first stage 1 may enter the refiner through an opening 60. An exhaust opening (not shown) may be provided in the upper portion of chamber 50. In chamber 52 an opening 62 is provided in the upper portion thereof for the escape of exhaust gases.

Fuel such as natural gas and an oxidant, preferably oxygen, are fed to the burners 57 and 58 and combustion occurs as the gas streams enter the molten pools 53 and 54. Another fuel which may be used to advantage in the submerged combustion burners is hydrogen because its product of combustion is water, which is highly soluble in molten glass. Employing oxygen as the oxidant is advantageous because it avoids introducing into the melt the major nitrogen constituent of air, which has poor solubility in molten glass. Using undiluted oxygen also improves contact between the oxygen and the reduced species in the melt. An excess of the oxidant may be provided to the burners beyond that required for combustion of the fuel so as to correct the reduced condition of the liquefied material entering the refining stage. Alternatively, if the liquefied material entering the refining stage includes a sufficient amount of uncombusted carbon, or if the temperature of the melt need not be increased, the oxidant alone may be injected into the molten pools 53 and 54 so as to provide the re-oxidizing function only. The oxidant may be introduced separately from the submerged combustion burners, such as through bubbler tubes 55 and 56. It has been found advantageous to use bubblers in combination with submerged combustion. The bubblers can be adapted to inject a stream of small bubbles of oxidant into the melt, which enhances the surface area of contact between the melt and the oxidant gas, and the submerged combustion provides vigorous agitation to mix the oxidant bubbles throughout the molten mass. The submerged combustion also provides very effective homogenization of the melt.

The amount of excess oxidant to be supplied to the refining stage will vary depending upon the particular conditions encountered and will depend upon the degree of reduction of the material entering the stage and the oxidation state desired for the final product. The degree of agitation, the vessel size and configuration, the effectiveness of the gas-liquid contact, and the residence time within the refining stage are factors in achieving re-oxidation. In order to achieve homogeneous re-oxidation to meet the standards for flat glass, it has been found preferable to carry out the re-oxidation in two sequential chambers as shown in the drawing, thereby providing greater assurance that each portion of the throughput is subject to oxidizing conditions during an adequate residence time. In glass, a reduced condition yields a brown colored glass due to the presence of sulfur in the sulfide state and iron. If clear glass is desired, re-oxidation is carried out to sufficiently raise the oxidation state of the coloring ions, typically expressed in terms of the $Fe^{+3}/Fe^{+2}$ ratio. For a standard commercial grade of clear float glass the $Fe^{+3}/Fe^{+2}$ ratio is in the range of about 1.5 to 3.0, with a transmittance of at least 70% (preferably at least 80%) to light having a wavelength of 380 nanometers at a thickness of 6 millimeters. Clear float glass may sometimes also be characterized by at least 60 percent transmittance at 1000 nanometers (6 millimeter thickness). $Fe^{+3}/Fe^{+2}$ ratios considerably greater than the above have been achieved by bubbling oxygen into molten glass that was initially dark brown. The change in coloration from brown to clear upon oxidation is readily observable, so that the appropriate degree of oxidation can be easily estimated by visual observation. Although coal may contribute excess iron to the melt, a clear glass can be obtained by re-oxidizing. But precise spectral matching of standard float glass transmittance may require reducing the amount of iron that is usually deliberately included in the batch (usually as rouge) for coloration.

Downstream from the re-oxidizing chambers, there may be provided a conditioning chamber 64 as shown in the drawing in which additional residence time may be provided for the escape of gaseous inclusions from the melt and for the melt to cool to a temperature suited for subsequent processing. The molten material may enter the conditioning chamber 64 through a submerged throat 66. In the arrangement shown, residence time within the chamber 64 is extended by means of a submerged dam 67 and a skim barrier 68 which establish a tortuous path for the melt stream. The processed molten material may be drawn from the refining stage 11 through a canal 70 which may lead to a forming process or the like, which, in the case of glass, may form the glass into a sheet, fibers, bottles or the like by known means.

The detailed description of this invention has been set forth in connection with a best mode, but it should be understood that other variations and modifications that would be evident to those of skill in the art may be employed within the spirit and scope of the invention as defined by the claims which follow.

We claim:

1. A method of making glassy or ceramic material comprising providing batch material mixed with solid or liquid fuel having an ash content in a preheating stage, combusting the fuel in the preheating stage so as to heat the batch material to a temperature below its fusion temperature, passing the heated batch in admixture with the ash to a stage were the batch is liquefied, and completing melting of the material under oxidizing conditions so as to produce an essentially oxidized product.

2. The method of claim 1 wherein the fuel is mixed with the batch material before being fed to the preheating stage.

3. The method of claim 1 wherein the fuel mixed with the batch material provides substantially all of the energy required for the preheating stage.

4. The method of claim 1 wherein the fuel includes coal.

5. The method of claim 1 wherein the fuel includes a liquid petroleum product.

6. The method of claim 1 wherein the liquefying stage is heated by combustion and the exhaust is passed from the liquefying stage into the preheating stage.

7. The method of claim 1 wherein the preheating stage includes agitating the batch materials in a rotating vessel as the batch materials are conveyed from one end of the rotating vessel to the other end.

8. The method of claim 1 wherein the batch material is liquefied on a sloped surface in the liquefying stage and drains freely therefrom.

9. The method of claim 1 wherein an oxygen source having a higher concentration of oxygen than air is fed to the preheating stage to support the combustion.

10. The method of claim 9 wherein the oxygen source consists essentially of oxygen.

11. The method of claim 6 wherein an oxygen source having a higher concentration of oxygen than air is fed to the liquefying stage to support the combustion there.

12. The method of claim 11 wherein the oxygen source consists essentially of oxygen.

13. The method of claim 1 wherein the batch material is liquefied in a reduced state and is passed to a third stage where it is re-oxidized.

14. The method of claim 1 wherein the batch material is conveyed through the preheating stage from an inlet end towards an outlet end, and the flow of combustion gases in the preheating stage is maintained generally in the direction of the outlet end.

15. The method of claim 14 wherein products of combustion from the preheating stage are passed to the liquefying stage.

16. The method of claim 15 wherein the products of combustion include carbon monoxide.

17. The method of claim 16 wherein the carbon monoxide constitutes the major energy source for the liquefying stage.

18. The method of claim 1 wherein the batch material fed to the preheating stage includes alkaline earth carbonates, and the temperature in the preheating stage is sufficient to calcine a substantial portion of the carbonates.

19. The method of claim 18 wherein the material fed to the first stage is substantially free of constituents that melt at temperatures below the calcining temperature, further including feeding to the liquefying stage batch material that melts at temperatures below the calcining temperature.

20. The method of claim 1 wherein the batch material is discharged from the preheating stage with a portion of the fuel uncombusted, whereby the uncombusted fuel serves as an energy source from the liquefying stage.

21. The method of claim 1 wherein the batch material comprises a batch mixture for a soda-lime-silica glass.

22. The method of claim 13 wherein the re-oxidizing produces clear glass.

23. A method of heating pulverulent material comprising:
feeding pulverulent material at an inlet end of a heating vessel and conveying the material through the vessel toward an outlet end;
providing solid or liquid fuel mixed with the material within the vessel;
supplying a gaseous source of oxygen to a combustion zone within the vessel so as to sustain combustion of the fuel while mixed with the material, whereby the material is heated primarily by said combustion; and
maintaining gas flow within the vessel generally in the direction of the outlet and so that volatiles from the fuel approaching the combustion zone are carried into the combustion zone.

24. The method of claim 23 wherein the vessel is a first stage and gaseous products of combustion are passed from the first stage to a second stage where heating of the material is continued.

25. The method of claim 24 wherein the gaseous products passed from the first stage to the second stage include conbustible material which is combusted in the second stage.

26. The method of claim 25 wherein the combustible material includes carbon monoxide.

27. The method of claim 26 wherein the temperature in the combustion zone of the first stage is at least 900° C.

28. The method of claim 26 wherein carbon monoxide from the first stage constitutes a major portion of the energy source for heating the second stage.

29. The method of claim 23 wherein the source of oxygen supplied to the combustion zone has a higher concentration of oxygen than air.

30. The method of claim 29 wherein the oxygen source is substantially free of nitrogen.

31. The method of claim 27 wherein the material fed to the first stage is substantially free of constituents that melt at temperatures below 900° C., and a second portion including material that melts at temperatures below 900° C. is fed to the second stage.

32. The method of claim 23 wherein the material fed to the first stage includes alkaline earth carbonates, and the temperature in the combustion zone is sufficient to calcine a substantial portion of the carbonates.

33. The method of claim 32 wherein the material fed into the first stage is substantially free of constituents that melt at temperatures below the calcining temperature, further including feeding to the second stage material that melts at temperatures below the calcining temperature.

34. The method of claim 23 wherein the material is agitated in a rotating enclosure as it passes through the first stage.

35. The method of claim 24 wherein material entering the second stage is deposited onto a sloped surface facing a central heated cavity.

36. The method of claim 23 wherein the fuel is coal.

37. The method of claim 23 wherein the fuel is a liquid petroleum product.

38. The method of claim 23 wherein the material is discharged from the vessel in a pulverulent, substantially free-flowing condition.

39. The method of claim 23 wherein the fuel is mixed with the material before being fed to the first stage.

40. The method of claim 23 wherein the gaseous source of oxygen is introduced into the vessel at an intermediate location spaced from the inlet end and the outlet end.

41. The method of claim 24 wherein the material is discharged from the first stage with a portion of the fuel uncombusted, whereby the uncombusted fuel serves as an energy source in the second stage.

42. The method of claim 24 wherein the material is drained from the second stage immediately upon liquefying and is passed to a third stage where it is subjected to refining treatment.

43. The method of claim 42 wherein the refining treatment includes raising the oxidation state of the liquefied material.

44. The method of claim 43 wherein the liquefied material is gathered into a pool in the third stage and is agitated by injection of heated gas into the pool.

45. The method of claim 23 wherein a portion of the oxygen for combustion of the fuel in the vessel is provided by oxygen-containing compounds in the materials.

46. The claim 45 wherein additional oxygen is provided by discharging substantially pure oxygen into the combustion zone of the first stage.

47. The method of claim 23 wherein the material fed to the vessel is substantially free of material that fuses below 900° C., and carbon monoxide is the major product of combustion.

48. The method of claim 23 wherein the batch material comprises a batch mixture for a soda-lime-silica glass.

49. The method of claim 44 wherein the product of the refining treatment is clear molten glass.

50. The method of claim 49 wherein the glass is soda-lime-silica glass.

51. A method of making glassy or ceramic material comprising:
providing in a first heating zone a first glass batch portion substantially free of constituents that melt below 900° C. mixed with solid or liquid fuel having an ash content;
combusting the fuel in the first zone so as to heat the first batch portion to at least 900° C.;
passing the heated batch portion in admixture with the ash to a second heating zone;
feeding a second batch portion that includes constituents that melt below 900° C. to the second zone;
heating the second zone so as to liquefy the batch materials and ash mixed therewith; and
completing the melting of the materials.

52. The method of claim 51 wherein gaseous products of combustion are passed from the first heating zone to the second heating zone and include combustible material which is combusted in the second heating zone.

53. A method of making glassy or ceramic material comprising providing in a first heating zone a first glass batch portion, including alkaline earth carbonates and substantially free of constituents that melt below the calcining temperature of the carbonates, mixed with the solid or liquid fuel having an ash content; combusting the fuel in the first zone so as to heat the first batch portion to a temperature sufficient to calcine a substantial portion of the carbonates; passing the heated first batch portion in admixture with the ash to a second heating zone; feeding a second batch portion that includes constituents that melt below the calcining temperature of the carbonates to the second heating zone; heating the second zone so as to liquefy the batch materials and ash mixed therewith; and completing the melting of the materials.

54. The method of claim 53 wherein gaseous products of combustion are passed from the first heating zone to the second heating zone and include combustible material which is combusted in the second heating zone.

* * * * *